United States Patent [19]

Baumann

[11] Patent Number: 5,058,861
[45] Date of Patent: Oct. 22, 1991

[54] BELLOWS SEAL AND METHOD FOR ASSEMBLING

[76] Inventor: Hans D. Baumann, 32 Pine St., Rye, N.H. 03870

[21] Appl. No.: 484,815

[22] Filed: Feb. 26, 1990

[51] Int. Cl.$^5$ ............................................. F16K 41/10
[52] U.S. Cl. ................................. 251/335.3; 251/214; 277/200; 277/213
[58] Field of Search ................... 137/315, 15; 251/214, 251/88, 335.3, 331; 277/200, 213

[56] References Cited

U.S. PATENT DOCUMENTS

| | | | |
|---|---|---|---|
| 1,763,486 | 6/1930 | Strong | 251/88 |
| 2,563,992 | 8/1951 | De Grave | 251/88 |
| 2,887,293 | 5/1959 | Gasche | 251/88 |
| 2,912,867 | 11/1959 | Gallant | 251/335.3 |
| 2,956,771 | 10/1960 | Shields | 251/331 |
| 3,206,165 | 9/1965 | Salmon et al. | 251/214 |
| 3,761,052 | 9/1973 | Tobbe et al. | 251/88 |
| 4,240,610 | 12/1980 | Trimble | 277/200 |
| 4,399,834 | 8/1983 | Baumann | 251/214 |
| 4,634,099 | 1/1987 | Danko et al. | 251/335.3 |
| 4,687,017 | 8/1987 | Danko et al. | 251/335.3 |
| 4,688,601 | 8/1987 | Astill | 251/335.3 |

FOREIGN PATENT DOCUMENTS

| | | | |
|---|---|---|---|
| 517731 | 10/1955 | Canada | 251/88 |
| 939657 | 1/1974 | Canada | 251/214 |
| 1208769 | 2/1960 | France | 251/214 |
| 626452 | 10/1961 | Italy | 251/214 |
| 20965 | 5/1911 | United Kingdom | 251/88 |
| 869101 | 5/1961 | United Kingdom | 251/335.3 |

Primary Examiner—George L. Walton

[57] ABSTRACT

A bellows seal designed to hermetically seal reciprocating stems from internal fluid pressure in control valves and methods of engaging and disengaging conventional valve plugs and rotatable valve stems from said bellows seal within a completely sealed environment, without resorting to welding joints.

3 Claims, 1 Drawing Sheet

BELLOWS SEAL AND METHOD FOR ASSEMBLING

BACKGROUND OF INVENTION

This invention relates to a substitution of adjustable valve packings around reciprocating stems for control valves and the like that see considerable amounts of motion; and where such conventional packings could wear, and as a result, open leakage paths for the fluid between the valve interior and the outer-atmosphere at the given valve location. This is especially hazardous where the valve is handling poisonous or radioactive substances.

Bellows seals, either in the hydroformed configuration or fabricated from metal rings welded together, are not new and well understood by persons skilled in the art, see example U.S. Pat. No. 2,956,771.

The problem with such conventional, state-of-the-art stem seals is that at least one terminating end of such bellows has to be welded to the device that has to be sealed. This makes the replacement very difficult and costly. The other drawback of present state-of-the-art designs is found in a way that valve stems are kept from rotating. Any attempt of forced rotation from the actuator side of a valve stem to a permanently fixed interconnection between stem and bellows (usually by welding) will twist such a bellow and cause mechanical failure. Conventional constructions, therefore, use profiled stems, such as a hexagonal cross-section, sliding in a similar hexagonal bearing port, or by employing a radial pin within part of the stem, which slides in a grooved slot as part of a companion static valve part in order to avoid rotation. All these methods are very expensive to produce and also add unnecessary bulk to such an assembly. Finally, existing bellows designs cannot employ conventional valve plugs that are normally used with valves which employ conventional stem packing. Again, this is due to requirements for welded connections. This leads to a major maintenance problem by users and adds increased manufacturing costs to the assembly.

My invention overcomes all these drawbacks by providing a bellows assembly that:
a. requires no welded connections,
b. allows the use of conventional, pinned valve plugs that can easily be field replaced; and
c. provides a way to allow free rotation of the valve stem without inputting torsion onto the bellows and yet be able to lift both bellows and valve plug up and down.

These and other advantages and novel results will become apparent in view of the annexed drawings and the following descriptions.

DESCRIPTION OF THE INVENTION

Figure 1:
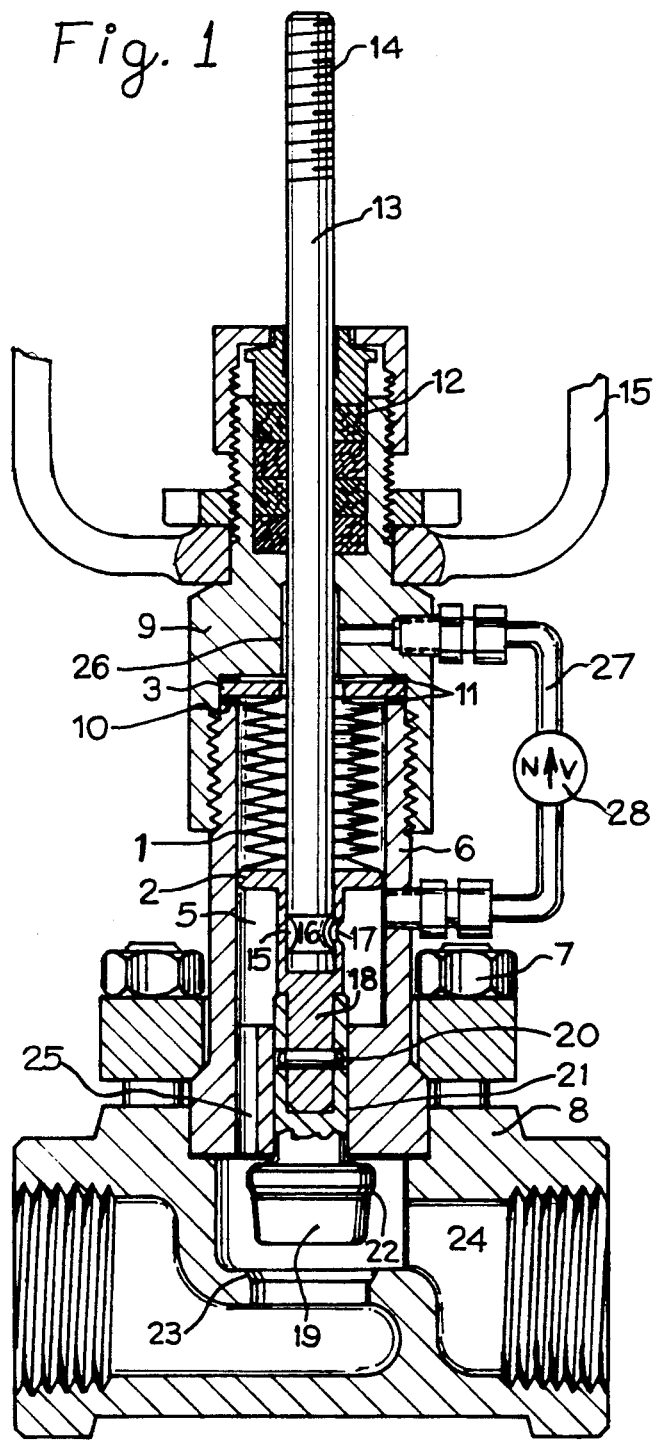
FIG. 1 is a vertical, central, cross-sectional view showing a preferred structure and an arrangement of parts of my invention with conventional actuating means removed.

The subject invention comprises a bellows (1) illustrated to be welded from individual leaf-type metal rings joined at the lower terminating end to a fitting (2) and welded to a flat washer (3) at the upper terminating end. All three parts constitute the bellows assembly (4), which is retained within a longitudinal bore (5) of a bonnet (6) which in turn is fastened by suitable means (7) to the top portion of a conventional valve housing (8). The washer (3) is retained by a threaded cover (9) against the terminating face (10) of bonnet (6). Sealing is provided by suitable gaskets (11).

Threaded cover (9) contains a conventional packing box arrangement (12) sealingly engaging a reciprocating valve stem (13). Packing box (12) is provided as a backup seal in case bellows subassembly (4) is damaged.

The top portion (14) of stem (13) is threaded to engage a similarly threaded bore in a conventional actuating device whose lower portion (15) is partially shown.

The fitting (2) has a central bore (15) slidingly engaging the lower grooved portion (16) of stem (13). During the assembly process, a portion of the thin wall of fitting (2) is willfully deformed (17) to partially engage the grooved section (16) of stem (13), which enables the latter to lift up fitting (2) and, thereby, compress bellows subassembly (4). Yet, this does not prevent stem (13) from rotating freely when the stem is threadingly engaged with the actuator during the normal assembly or disassembly process without inputting rotational strain into the bellows that could cause mechanical failure. The shown deformation (17), by crimping or other means, will not violate the sealing requirements of bellows assembly (4) which a drilled pin or other mechanical means might cause.

Referring back to fitting (2), the lower terminating portion (18) is configured as a conventional valve stem and thereby, either slidingly (as shown) or threadingly, engaging a conventional valve plug (19). A cylindrical pin (20) slidingly engages both portion (18) and plug (19) as is customary in the art to prevent disengagement of the plug during normal valve actuation. Valve plug (19), in FIG. 1, is shown in the maximum open travel position where pin (20) is well within the confines of a guide bore (21), being part of bonnet (6). Likewise, when the seating portion (22) engages a complimentary surface (23) within valve housing (8), pin (20) is still within the confines of guide (21) and, therefore, cannot fall out.

In normal operation, fluid pressure will fill cavity (24) of housing (8) and will pressurize cavity (5) and the exterior of bellows assembly (4) via access port (25), however, as long as bellows assembly (4) maintains its mechanical integrity and gaskets (11) perform their sealing function, no fluid pressure will be able to enter cavity (26) and ultimately escape via packing (12) to the exterior of the valve. What this invention has accomplished is that it provides a close mechanical coupling between a bellows subassembly, a rotatable valve stem, and a conventional valve plug that requires no special machining and without resorting to welding joints or anti-rotation devices to protect the bellows from damage. Additionally, the bellows can be replaced quite easily in the field without requiring special skills or tooling and the valve plug (19) can be disengaged at will and be replaced with a different plug without need for breaking welding seams or replacement of expensive bellows assemblies.

Figure 2:
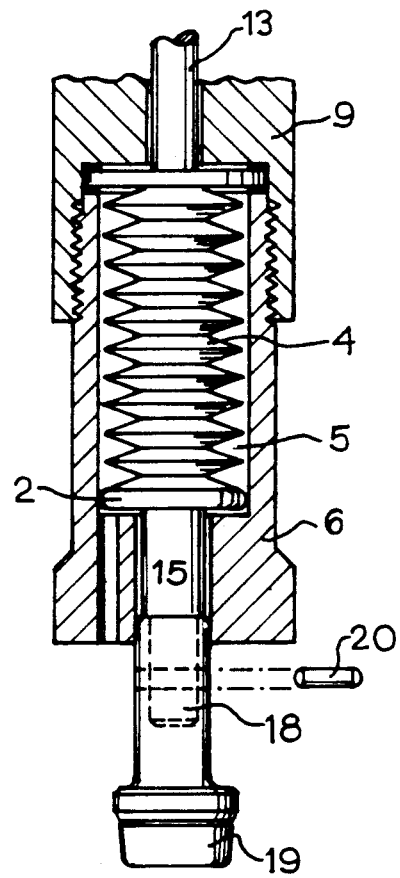
FIG. 2 is a horizontal cross-sectional view of the bonnet portion of FIG. 1 with the bellows in the maximum extended position.

Referring to FIG. 2, if disengagement of the valve plug is required, then bonnet (6) is disengaged from housing (8) and stem (13) together with fitting (2) is pushed down throughout the length of cavity (5). This is possible since valve plug (19) is no longer restrained by housing seating surface (23). Being free of guide surface (21), it is now possible to slidingly disengage pin (20) and thereafter disengage freely valve plug (19) from lower portion (18) of fitting (2). By disengaging the upper threaded cover (9) from bonnet (6), one can now remove bellows assembly (4) from cavity (5) for inspection or maintenance.

In order to protect bellows subassembly (4) during hydrostatic testing (at a much higher fluid pressure than the normal working pressure), a by-pass tubing (27) can be provided between cavity (5) and cavity (26) normally interrupted by a needle valve (28). By opening needle valve (28), identical fluid pressure levels will exist on either side of the bellows wall and damage can be prevented. By closing needle valve (28), the normal sealing functions of bellows seal (4) are restored.

Having shown my invention in a preferred way should not preclude numerous changes in the mechanical construction without departing from the scope of the annexed claims. For example, identical results will be achieved if one would use so-called hydroformed convoluted bellows instead of the welded ones or by threadingly engaging valve plug (19) instead of slidingly. Likewise, a tapered pin or set screw may be substituted for pin (20).

I claim:

1. Bellows seal assembly comprising:
   a. convoluted expandable or compressible bellows whose external periphery is pressurized having a circular interior non-pressurized passage throughout with one terminating end of said bellows connected to a plate having a diameter that extends over said interior passage of the bellows, the other end welded to a lower fitting having an interior bore followed by a cylindrical extension said cylindrical extension and said interior bore extending beyond the terminating end of said bellows and where a portion of the fitting having the interior bore is tubular in shape;
   b. a valve stem having a radially grooved lower terminating tip passing through said interior passage of the bellows and slidingly engaging said grooved tip within the interior bore of said fitting but not extending through the complete length of said fitting, and wherein part of the tubular section of said fitting is crimped towards the center in order to displace a portion of the tubular wall towards and inside the stem groove for securing said fitting to said valve stem within the non-pressurized interior of said bellows and securing said fitting to a valve sealing means to allow reciprocating movement of said valve sealing means and thereby preventing said stem from disengaging from said fitting while allowing a free rotational movement of said stem within the interior bore of said fitting by the stem groove and the crimped section thereby preventing breakage of said bellows when the valve stem is improperly rotated.

2. Bellows seal assembly as described in claim 1, wherein said bellows is engaged within a longitudinal bore of a valve bonnet that can be fastened to a valve housing, said bonnet additionally comprising a lower cylindrical guide section; said valve sealing means comprises a conventional valve plug having an upper, cylindrical guide portion slidingly engaging said bonnet guide section and further having an opening within said cylindrical guide suitably configured to engage the cylindrical extension of said fitting; fastening means designed to prevent the disengagement of the valve plug from said extension of the fitting and where such fastening means is located in a portion of the upper cylindrical plug guide that stays constantly engaged within the guide section of the bonnet whenever the valve plug is moved through its range of normal travel, but which may disengage from said guide portion whenever said bonnet is not fastened to said valve housing and thereby permit a greater extension of said bellows with fitting.

3. A bellows assembly as described in claim 1, wherein a by-pass tubing is attached to said bonnet in such a way as to permit fluid pressure from passing from an area below and exterior of the bellows to an area above said plate only for purposes of conducting a hydrostatic test and wherein said tubing encompasses a needle valve to selectively interrupt the by-pass of fluid pressure.

* * * * *